(12) United States Patent
Johnson

(10) Patent No.: US 11,193,570 B2
(45) Date of Patent: Dec. 7, 2021

(54) CONTINUOUS VARIABLE SPEED TRANSMISSION USING VARIABLE COUPLING ARRANGEMENT

(71) Applicant: David Johnson, Pell City, AL (US)

(72) Inventor: David Johnson, Pell City, AL (US)

( * ) Notice: Subject to any disclaimer, the term of this patent is extended or adjusted under 35 U.S.C. 154(b) by 47 days.

(21) Appl. No.: 16/682,090

(22) Filed: Nov. 13, 2019

(65) Prior Publication Data
US 2020/0080624 A1    Mar. 12, 2020

Related U.S. Application Data

(63) Continuation of application No. 16/217,801, filed on Dec. 12, 2018, now Pat. No. 10,502,300.

(60) Provisional application No. 62/598,153, filed on Dec. 13, 2017.

(51) Int. Cl.
*F16H 47/07*    (2006.01)
*F16H 3/093*    (2006.01)
*F16H 45/02*    (2006.01)

(52) U.S. Cl.
CPC .......... *F16H 47/07* (2013.01); *F16H 3/093* (2013.01); *F16H 45/02* (2013.01)

(58) Field of Classification Search
CPC .......... F16H 3/093; F16H 41/04; F16H 41/22; F16H 45/02; F16H 47/07; F16D 33/04
See application file for complete search history.

(56) References Cited

U.S. PATENT DOCUMENTS

| | | | | |
|---|---|---|---|---|
| 2,063,471 A | * | 12/1936 | Stedefeld | F16H 47/07 74/655 |
| 2,423,820 A | * | 7/1947 | Baumann | F16D 67/00 74/718 |
| 2,574,492 A | * | 11/1951 | Nowak | F16D 33/04 60/354 |
| 2,918,156 A | * | 12/1959 | Hall | F16D 33/04 192/3.28 |
| 2,995,897 A | * | 8/1961 | Parrish | F16D 33/00 60/363 |
| 3,106,102 A | * | 10/1963 | Clements | F16H 37/00 74/359 |
| 3,238,726 A | * | 3/1966 | Jandasek | F16H 47/06 60/348 |
| 3,270,587 A | * | 9/1966 | Geray | F16H 41/22 74/730.1 |

(Continued)

*Primary Examiner* — William C Joyce
(74) *Attorney, Agent, or Firm* — Burr & Forman LLP; Jeffrey H. Kamenetsky; Patrick A. Reid

(57) ABSTRACT

The variable speed transmission uses multiple fluid couplings to provide a sturdy, durable variable output ratio transmission by using hydraulic fluid to vary the output. Each fluid coupling has an independent output shaft driven by the respective fluid coupling turbine. Output shafts drive alternate gears (i.e., first and third at a first fluid coupling and second and fourth at a second fluid coupling). This configuration alternates gear shifts between the fluid couplings allowing the next gear up or down to be engaged before disengaging the current gear, for uninterrupted gear changes in both up and down shifting. A fifth gear would be driven by a gear connected to the fluid coupling input shafts. Gears could be engaged with hydraulic clutches or syncromesh gears. This combined with variable slip fluid couplings allows for better torque and control.

4 Claims, 4 Drawing Sheets

(56) References Cited

U.S. PATENT DOCUMENTS

| | | | | |
|---|---|---|---|---|
| 3,377,876 A | * | 4/1968 | Finke | F16H 3/093 |
| | | | | 74/360 |
| 3,383,949 A | * | 5/1968 | Edmunds | F16H 47/07 |
| | | | | 475/34 |
| 3,593,596 A | * | 7/1971 | Race | F16H 47/07 |
| | | | | 74/720 |
| 3,653,279 A | * | 4/1972 | Sebern | F16D 67/00 |
| | | | | 475/33 |
| 3,751,922 A | * | 8/1973 | Cottrell | F16D 33/04 |
| | | | | 60/349 |
| 3,934,415 A | * | 1/1976 | Becker | F16D 33/04 |
| | | | | 60/353 |

* cited by examiner

CONTINUOUS VARIABLE SPEED TRANSMISSION USING VARIABLE COUPLING ARRANGEMENT

CROSS-REFERENCE TO RELATED APPLICATION

This application is a continuation of U.S. Non-Provisional patent application Ser. No. 16/217,801, titled Continuous Variable Speed Transmission Using Variable Coupling Arrangement which claimed the benefit of U.S. Provisional Patent App. No. 62/598,153 titled Continuous Variable Speed Transmission Using Variable Coupling Converter Arrangement. The prior applications are herewith incorporated by reference in their entirety.

FIELD

This application relates to engine transmissions and, more particularly, to a new design for a variable speed transmission.

BACKGROUND

Conventional automatic transmissions use a set of gears that provide a given number of ratios. The transmission shifts gears to provide the most appropriate ratio for a given situation. Lowest gears are used for the start of a drive, middle gears are used for acceleration and passing, and higher gears are used for fuel-efficient driving. A constantly or continuously variable speed transmission (CVT) is an automatic transmission that can change seamlessly through a continuous range of effective gear ratios. This differs from other mechanical transmissions that offer a fixed number of gear ratios.

Some CVTs use large belts such as oversized fan belts, while other CVTs use metal mesh or casings to help strengthen them. However, these types of CVTs are not sturdy and are inordinately loud.

SUMMARY

The present disclosure provides a CVT using multiple fluid couplings with variable input from the couplings that provides a steady output to the drive train thus gradually varying output revolutions per minute (rpm) without pauses in gear changes. The present disclosure utilizes a fluid coupling with metal gears. The present design also employs a variable or adjustable coupling that allows the engine input to be varied according to the amount of space between the input impeller and the output turbine inside the coupling as opposed to current couplings that have fixed position impellers and turbines. This will allow continuously variable ratios of input to output resulting in constantly variable transmission using hydraulic fluid instead of friction or belt drives.

In accordance with one aspect of the disclosure, a variable speed transmission using hydraulic fluid is provided. The transmission includes an input shaft driven by an engine flywheel, a drive shaft for driving wheels of a vehicle, a first fluid coupling comprising a first turbine and a first impeller, the first turbine configured to rotate in response to rotation of the first impeller, the first impeller controlled by the input shaft, the first turbine connected to and configured to drive a first output shaft, the first output shaft configured to drive a first set of alternating gears, and a second fluid coupling including a second turbine and a second impeller, the second turbine configured to rotate in response to rotation of the second impeller, the second impeller controlled by the input shaft, the second turbine connected to and configured to drive a second output shaft, the second output shaft configured to drive a second set of alternating gears. One of the first and second set of alternating gears transfers force from a corresponding turbine to the drive shaft to drive the wheels of the vehicle. The variable speed transmission further includes a control module, the control module configured to adjust a distance between the impellers and turbines in each of the fluid couplings.

In one embodiment of this aspect, the control module is configured to adjust the distance between the impellers and the turbines by moving at least one of the impeller and the turbine in the fluid coupling.

In another embodiment, each impeller includes impeller vanes and each turbine includes turbine vanes, and the control module is configured to adjust the distance between the impellers and turbines by moving at least one of the impeller vanes or turbine vanes.

In another embodiment, the first set of alternating gears is located on a first counter shaft and the second set of alternating gears is located on a second counter shaft, where the first and second counter shafts are configured to transfer the force from the fluid couplings to the drive shaft.

In another embodiment, the variable speed transmission further includes a direct drive gear, the direct drive gear located on the first counter shaft, and a lock up clutch configured to rotationally lock the impellers and turbines of the fluid couplings so that rotational force from the engine flywheel is transferred to the drive shaft.

In another embodiment, the lock up clutch is a multi-plate clutch.

In another embodiment, a next gear in the shifting sequence is engaged simultaneously with a current gear, and the impeller and turbine of the fluid coupling corresponding to the next gear are at a maximum distance apart.

In another embodiment, at least one of the fluid couplings is a torque converter.

In accordance with another aspect, a constantly variable speed transmission using multiple fluid couplings is provided. The transmission includes an input shaft driven by an engine flywheel, a drive shaft for driving the wheels of a vehicle, two or more fluid couplings. The fluid couplings including an impeller and a turbine. The impellers are controlled by the input shaft which is controlled by the engine flywheel. The impellers and turbines have vanes for moving the transmission fluid. As the impeller vanes move the transmission fluid, the turbines to rotate in response to rotation of the transmission fluid. Each turbine is connected to a separate output shaft, each output shaft rotates with rotation of the respective turbine. On the end of one output shaft are the odd output gears which correspond to and engage the odd drive gears. On the end of the other output shaft are the even output gears. The even output gears correspond to and engage with even drive gears. The odd and even output gears transferring rotational force from the respective fluid coupling to the respective odd or even drive gears, which in turn transfer the force to the drive shaft to drive wheels of the vehicle. The fluid couplings also have a control module that adjusts the distance between the impellers and turbines to control the amount of slip and, therefore, the amount of torque applied by the impellers to the turbines.

In another embodiment, the control module is configured to adjust a distance between the impellers and turbines by moving the vanes.

In another embodiment, the odd drive gears are located on a first counter shaft and the even drive gears located on a second counter shaft. The odd drive gears engage with the odd output gears and the even drive gears engage with the even output gears. The first and second counter shafts transfer force from the fluid couplings to the drive shaft.

In another embodiment, when an odd or an even gear is engaged, a next gear in a shifting sequence is engaged simultaneously and the distance between the impeller and turbine of the corresponding fluid coupling of the next gear is at a maximum.

DETAILED DESCRIPTION

Figure 1:
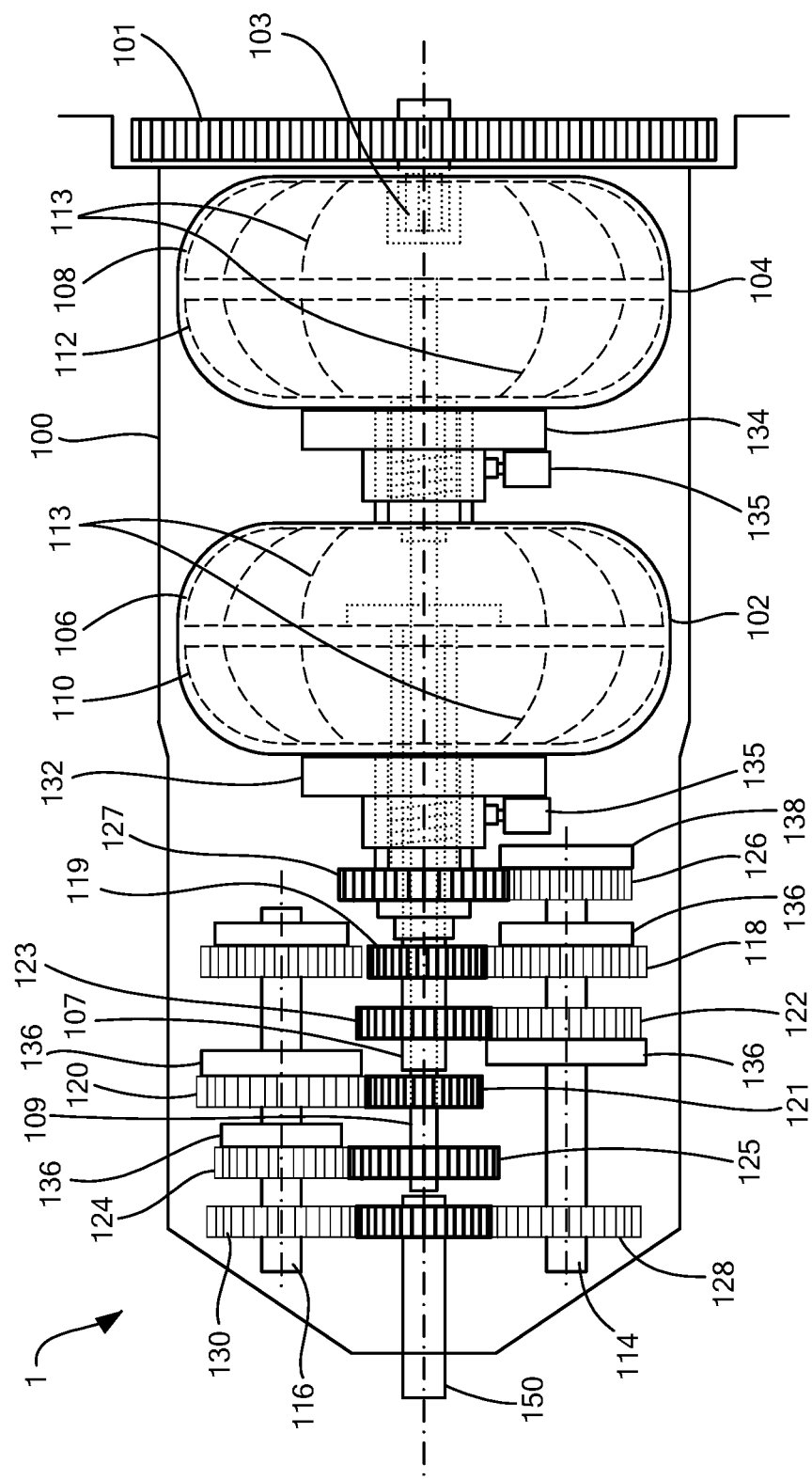
FIG. 1 illustrates a top elevation view of an embodiment of the CVT transmission of the present disclosure with the fluid couplings, shafts, and actuators shown as cutaway views.
Figure 2:
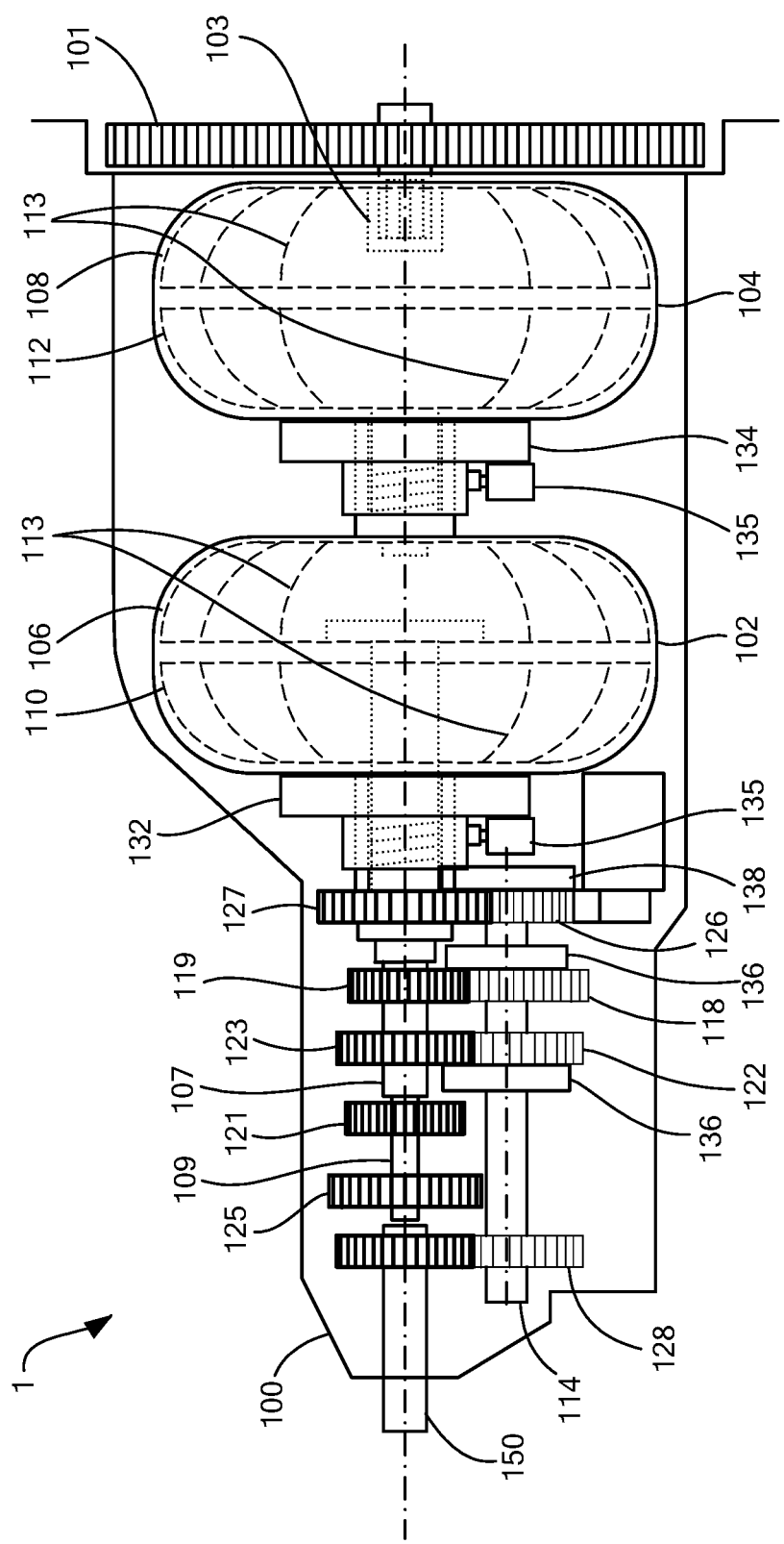
FIG. 2 illustrates a left side view of the CVT transmission of the present disclosure.

Referring to FIGS. 1 and 2, a top elevation view and a left side view of one embodiment of the CVT 1 of the present disclosure are shown. The CVT 1 is shown with two fluid couplings 102, 104. However, this disclosure is not limited to two fluid couplings, and it contemplated that the present disclosure may include more fluid couplings than just the two show in FIGS. 1 and 2. Although FIGS. 1 and 2 show the CVT 1 of the present disclosure with fluid couplings, it is contemplated that one or more of the fluid couplings 102, 104 used in CVT 1 could be torque converters. A torque converter is a fluid coupling that includes a stator. The stator increases the efficiency of a normal fluid coupling by redirecting the flow of transmission fluid coming from the turbine before it is returned via the pump.

Although all parts of the CVT 1 are shown in the figures within a transmission housing 100, in some embodiments, certain parts of CVT 1 could be located outside of the transmission housing 100 to conserve space.

A first fluid coupling 102 includes a first turbine 106 and a first impeller 110. A second fluid coupling 104 includes a second turbine 108 and a second impeller 112. The impellers 110, 112 are connected to an input shaft 103 extending from an engine flywheel 101 to provide the same engine rpm input to all coupling impellers. In another embodiment, the turbine 106, 108 could be driven instead of the impeller 110, 112.

In the configuration shown in FIG. 1 and subsequent figures, at least two of the fluid coupling turbines 106, 108 can be constantly engaged to counter shafts 114, 116 with varying degrees of torque applied at the output shafts 107, 109, which cause gradual change in the input-to-output ratio. First turbine 106 of first fluid coupling 102 is connected to a corresponding first output shaft 107. Second turbine 108 of second fluid coupling 104 is connected to a corresponding second output shaft 109. The result is a variable speed transmission that is neither a belt drive nor a friction drive. This provides a more durable alternative to current CVTs.

FIG. 1 shows the fluid couplings 102, 104 in an in-line arrangement. However, the present disclosure is not limited to in-line arrangements and it is contemplated that the improved CVT 1 could also be accomplished with fluid couplings in a side-by-side arrangement.

According to the embodiment of FIG. 1, the drive gears are constantly engaged during acceleration or deceleration. No shifting occurs as the torque is transferred from one fluid coupling, i.e., second fluid coupling 104 to the next, i.e., first fluid coupling 102. The drive gears shown in FIG. 1 include first drive gear 118, second drive gear 120, third drive gear 122, fourth drive gear 124, and fifth gear or lock up gear 126. While FIG. 1 only illustrates five drive gears, the present disclosure could include any number of gears. Clutches 136 are located on each output gear and can disengage each gear to eliminate torque feedback if required and to lock the gear for reverse and engine breaking. During shifting sequence, the multiple fluid couplings 102, 104 allow the clutches 136 to be completely disengaged from the drive gears which eliminates heat generated during operation, which is a cause of transmission failures.

The energy generated by the fluid couplings 106, 108 is transferred to the turbine output shafts 107, 109. Fluid couplings 102, 104 transmit rotation between shafts by means of the acceleration and deceleration of a fluid, such as oil or transmission fluid. In a fluid coupling 102, 104, the impeller 110, 112 is rotated by an input shaft 103. The vanes 113 of the impeller 110, 112 accelerate the fluid. Then, the fluid interacts with the vanes 113 of the respective turbine 106, 108 causing the turbine 106, 108 to rotate. The output shafts 107 and 109 rotate with their corresponding turbines, i.e., 106 and 108.

On the ends of the output shafts 107, 109 are output gears 119, 121, 123, 125, each of which interacts with a corresponding drive gear. In FIG. 1, first output shaft 107 has first output gear 119, which engages with first drive gear 118; and third output gear 123, which engages third drive gear 122. Second turbine output shaft 109 has second output gear 121, which engages second drive gear 120; and fourth output gear 125, which engages fourth drive gear 124. The arrangement shown uses conventional gears, but the disclosure could work with planetary gears as well.

First and third drive gears 118, 122 are located on first counter shaft 114. First fluid coupling 102 transfers energy via first output shaft 107 to first counter shaft 114 by interaction between either first output gear 119 and first drive gear 118, or third output gear 123 and third drive gear 122. Second and fourth drive gears 120, 124 are located on second counter shaft 116. Second fluid coupling 104 transfers energy via second output shaft 109 to second counter shaft 116 by interaction between either second output gear 121 and second drive gear 120, or fourth output gear 125 and fourth drive gear 124. Counter shafts 114, 116 then translate the force to the drive shaft 140 via drive shaft engagement gears 128, 130 located on respective counter shafts.

By placing alternating drive gears on different counter shafts, the engine is able to have two consecutive drive gears engaged simultaneously. Because each counter shaft interacts with a different fluid coupling, torque forces are used to eliminate loss of engine efficiency and provide smoother transitions when shifting gears.

Some embodiments may also include a fifth drive gear 126 lock up clutch 138. In one embodiment, the lock up clutch may be a multi-plate clutch. A multi-plate clutch is a type of clutch that uses multiple friction plates stacked together and operated by hydraulic cylinders or push rods to increase the coefficient of friction. In FIGS. 1 and 2, fifth drive gear 126 is located on first counter shaft 114. However, if the highest gear were, for example, sixth drive gear (not shown), then fifth drive gear 126 would work as a regular gear similar to first drive gear 118 and third drive gear 122. And sixth drive gear would be located on the second counter shaft 116 with corresponding lock up clutch. Locating the lock up clutch 138 in the transmission housing 100 instead of inside the fluid couplings 102, 104, allows for movement of the impellers 110, 112 inside their respective fluid couplings 102, 104.

In some embodiments of the CVT 1, one or both of the impellers 110, 112 and turbines 106, 108 can move forward and/or backward to vary the space between the impeller and turbine within the fluid coupling 102, 104 in order to modulate the amount of slip and torque. When the impeller 110, 112 vanes 113 are retracted, the slip is maximized. As the impeller 110, 112 vanes 113 are extended closer to the turbine, the slip decreases and the impeller imparts a stronger torque force on the turbine. In normal operation, the clearance between the turbines 106, 108 and impellers 110, 112 is about two to three millimeters. Increasing this gap a small amount, for example, between 10 or 15 millimeters, would greatly increase slip.

In one embodiment, the forward and backward movement of either the impellers 110, 112 or the turbines 106, 108 is performed by a control module 132, 134. In one embodiment, control modules 132, 134 are located within the housing 100 and, for example, may be located on or within the fluid couplings 102, 104. Varying the distance between the impellers 110, 112 and their respective turbines 106, 108 allows for control of slip and torque. The method by which control modules 132, 134 vary the distance between impellers 110, 112 may utilize a variety of mechanisms and technologies, and the present disclosure is not limited in this manner. For example, a gear drive or worm gear may be utilized, and pneumatic, hydraulic, and/or electronic systems may be employed. The control modules 132, 134 are shown moving impellers 110, 112. However, in an alternate configuration, the control modules 132, 134 could instead be configured to move the turbines 106, 108. In one non-limiting embodiment, control modules 132, 134 may be controlled by screw gears 135 where an electronic motor rotates the screw gear 135 to move the impellers 110, 112.

Another method to control the slip is to vary the angle of intake vanes 113 in the impellers 110, 112 or turbines 106, 108 in order to reduce centrifugal fluid flow. Changing the angle of the vanes could be controlled by, for example, an electric motor. In another embodiment, the impeller housing could include a dampening valve situated between the middle intake and the outer rim in order to reduce the centrifugal fluid flow which would control the force applied by transmission fluid to the turbine vanes. In another embodiment, the amount of fluid in the coupling housing can be varied in order to increase slip.

Figure 3:
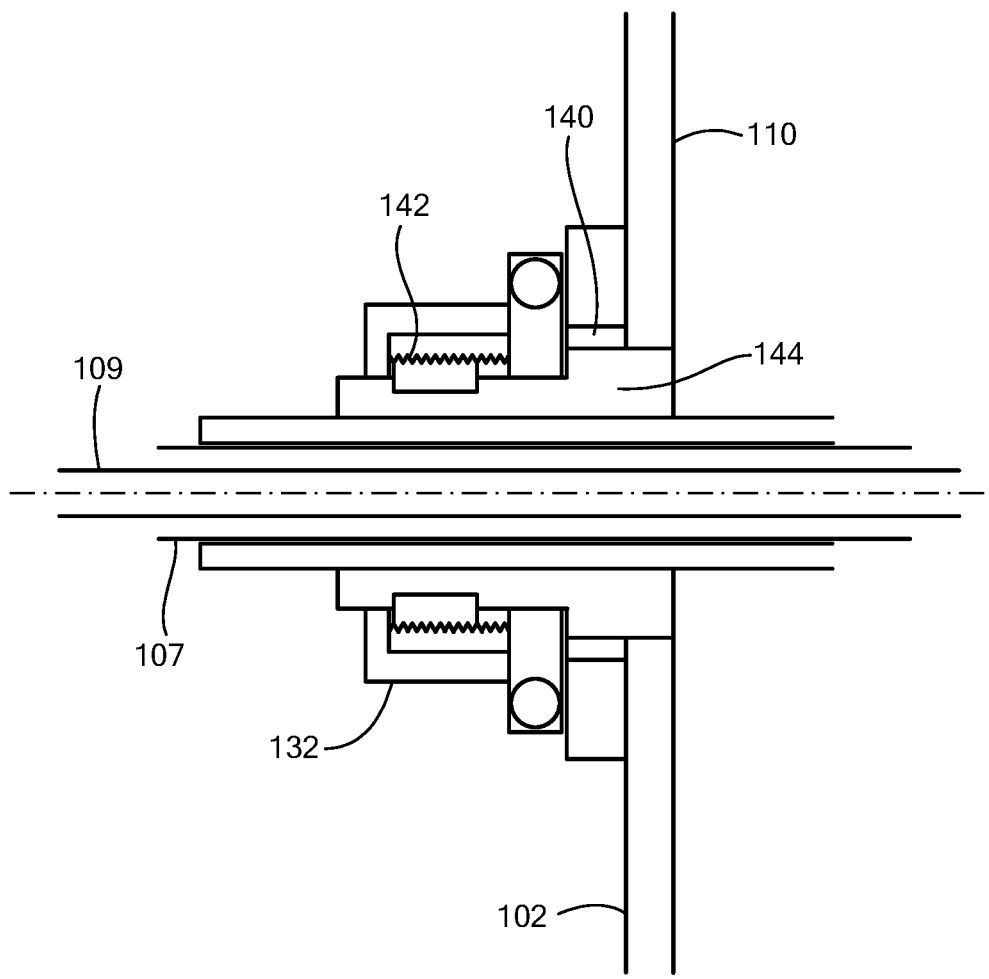
FIG. 3 illustrates a detailed view of the control module and the concentric relationship of the shafts used with the CVT transmission of the present disclosure.

Referring now to FIG. 3, a cut away detailed view of control module 132, 134 is shown as well as the concentric relationship of the output shafts 107, 109. Specifically, FIG. 3 shows a close up of first fluid coupling 102 because second fluid coupling 104 is connected to second output shaft 109. Control module 132 includes a threaded gear 142. The threaded gear 142 interacts with a movable bearing 144. The movable bearing 144 is attached to the housing of fluid coupling 102 by sliding spline gears 140 and to the impeller 110. When the threaded gear 142 rotates, the bearing 144 moves back and forth and, as a result, the impeller 110 moves toward or away from the turbine (not shown).

Figure 4:
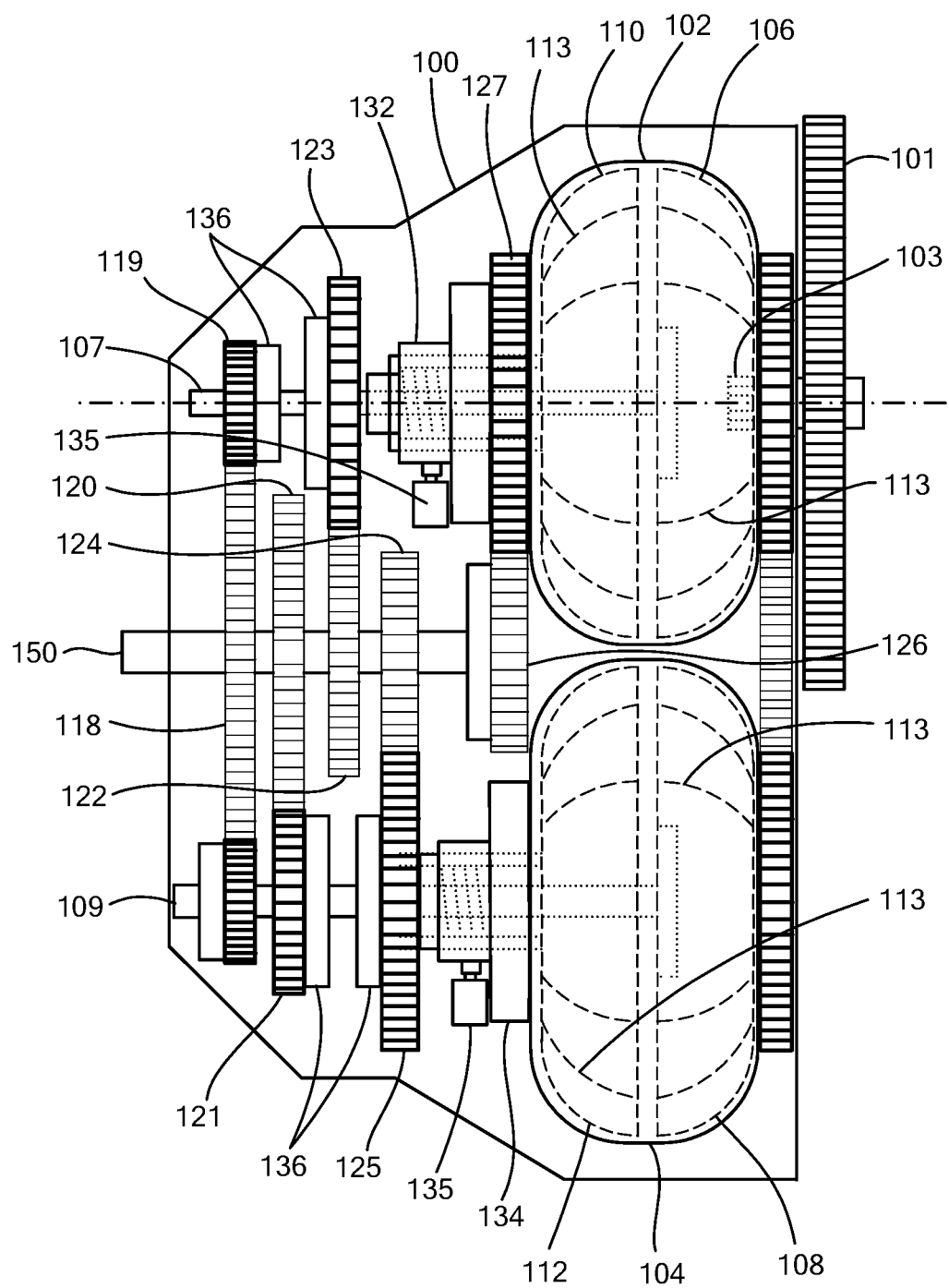
FIG. 4 illustrates another embodiment of the CVT transmission of the present disclosure where fluid couplings are arranged side by side.

Referring now to FIG. 4, another embodiment of the CVT 1 of the present disclosure is shown. In this embodiment, the fluid couplings 102, 104 can be placed side-by-side in the transmission housing 100. This configuration would alternate gear shifts between the fluid couplings 102, 104 as in previous configurations. Furthermore, the drive gears are located on respective output shafts. Specifically, first drive gear 118 and third drive gear 122 are located on first output shaft 107, and second drive gear 120 and fourth drive gear 124 are located on second output shaft 109. Instead of using output gears, the drive gears directly engage with gears on the drive shaft. The gear changing sequence will be the same in either embodiment (discussed in detail below). The exterior torque convertors would increase the size of the bell housing at the motor but shorten the transmission. Current transmissions have the torque converters connected directly to the engine and surrounded by a metal bell-shaped bell housing. Two couplings together would require a larger than normal bell housing. By having the couplings on the exterior of the transmission, in the side-by-side arrangement as shown, the length of the main transmission casing would be shorter than normal resulting in an overall wider but shorter transmission and housing. The arrangement of FIG. 4 could be used in front wheel drive configurations to reduce length. The output gear shaft could be shifted to reduce length even further.

Referring now to FIGS. 1 through 4, what follows is an explanation of the shifting sequence, in accordance with the present disclosure. The vehicle begins from a standing start as the accelerator is pressed, the engine rpm increases and torque is applied to the engine flywheel 101 and input shaft 103, the same principle as in current automatic transmissions. First drive gear 118 is engaged to first output gear 119 on first counter shaft 114 and first fluid coupling 102 applies maximum torque with first impeller 110 extended to minimum clearance from first turbine 106. Second gear 120 could also be engaged to second output gear 121 on second counter shaft 116 of second fluid coupling 104 at maximum slip and minimum torque with second impeller 112 retracted at least partially away from second turbine 108.

Second impeller 112 then begins to extend, controlled by the control module 134, gradually increasing output rpm to second output shaft 109. As the vehicle accelerates and first output shaft 107 rpm approaches the same speed as the first impeller 110 input rpm, first gear 118 is disengaged and third gear 122 is engaged at first counter shaft 114. The first fluid coupling 102 impeller 110 is retracted by control module 132 to allow first output shaft 107 to match speed with third drive gear 122. At the same time, control module 134 continues to extend second impeller 112 to minimum clearance from second turbine 108.

First impeller 110 then begins to extend to reduce clearance with first turbine 106, now with first output shaft 107 connected to third drive gear 122 on first counter shaft 114. As the vehicle accelerates, driven by third drive gear 122, second drive gear 120 disengages and fourth drive gear 124 engages. The same process can then be repeated.

While third drive gear 122 is engaged, when first turbine 106 rpm reaches the same speed as first impeller 110, third drive gear 122 disengages from third output gear 123 on first output shaft 107. Control module 132 retracts first impeller 110 and control module 134, and continues to extend second impeller 112 to minimum clearance. This results in the force being applied by second fluid coupling 104 to fourth drive gear 124 increasing to a maximum, and force applied by first fluid coupling 102 to third drive gear 122 decreasing to a minimum.

As the vehicle accelerates and second turbine 108 approaches the same rpm as second impeller 112, fifth drive gear 126 lock up clutch 138 engages to provide direct drive, fourth drive gear 124 disengages, and control modules 132, 134 retract impellers 110, 112.

In one embodiment, operation of the fluid couplings 102 and 104 of the present disclosure may be controlled by a digital processor either from a main expectation conditional maximization (ECM) algorithm or by a module at transmission that monitors engine input, shaft output, throttle position, and gear selection to modulate the convertor slip, clutches, and other components. A computer can be used to monitor engine power, input, and torque adjustment for maximum efficiency, instead of merely shifting up or down as in current transmissions.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A constantly variable speed transmission comprising:
    an input shaft driven by an engine flywheel;
    a drive shaft for driving the wheels of a vehicle;
    at least two fluid couplings, each fluid coupling comprising:
    an impeller and a turbine, each impeller and each turbine having vanes, each impeller controlled by the input shaft, each turbine configured to rotate in response to rotation of the respective impeller, each turbine connected to an output shaft, the output shaft configured to rotate with rotation of the respective turbine;
    a control module, the control module configured to adjust a distance between the impellers and turbines;
    odd drive gears located on a first counter shaft, the odd drive gears configured to engage with odd output gears;
    even drive gears located on a second counter shaft, the even drive gears configured to engage with even output gears;
    a shifting device configured to shift alternating gears such that a next gear in a shifting sequence is engaged simultaneously with a current gear; and
    the first and second counter shafts configured to transfer force from the fluid couplings to the drive shaft.

2. The variable speed transmission of claim 1, wherein the control module is configured to adjust the distance between the impeller and the turbine within each fluid coupling by moving the impeller within the fluid coupling.

3. The variable speed transmission of claim 1, wherein the control module is configured to adjust the distance between the impeller and the turbine within each fluid coupling by moving the turbine within the fluid coupling.

4. The variable speed transmission of claim 1, wherein when an odd or an even gear is engaged, a next gear in a shifting sequence is engaged and the distance between the impeller and turbine of the corresponding fluid coupling of the next gear is at a maximum.

\* \* \* \* \*